United States Patent [19]

Izumi et al.

[11] Patent Number: 4,933,686
[45] Date of Patent: Jun. 12, 1990

[54] METHOD OF AND APPARATUS FOR TRANSFERRING AN IMAGE IN A THERMAL TRANSFER PRINTER

[75] Inventors: Masaki Izumi, Yokohama; Yoshio Wachi; Naoko Yoshida, both of Tokyo, all of Japan

[73] Assignee: Eastman Kodak Company, Rochester, N.Y.

[21] Appl. No.: 327,885

[22] Filed: Mar. 23, 1989

[30] Foreign Application Priority Data

May 2, 1988 [JP] Japan .................... 63-109496

[51] Int. Cl.⁵ .................... G01D 9/00; H04N 1/21; B41J 3/02
[52] U.S. Cl. .................... 346/1.1; 346/76 PH; 400/120; 358/298
[58] Field of Search .................... 346/76 PH, 1.1; 219/216 PH; 400/120; 358/298

[56] References Cited

U.S. PATENT DOCUMENTS 4,621,271 11/1986 Brownstein .................... 346/76
4,691,211 9/1987 Brownstein .................... 346/76 PH
4,745,413 5/1988 Brownstein et al. .................... 346/76 PH
4,806,949 2/1989 Onuma et al. .................... 346/76 PH

FOREIGN PATENT DOCUMENTS 0130379 10/1981 Japan .................... 400/120
0117772 7/1983 Japan .

Primary Examiner—Bruce A. Reynolds
Assistant Examiner—Huan Tran
Attorney, Agent, or Firm—Raymond L. Owens

[57] ABSTRACT

A method of transferring an image to a receiver in a thermal transfer printer including a printing head having a plurality of heating elements for effecting one-line printing by selectively driving the heating elements on the basis of transfer data. While a recording medium is moved with respect to the heating elements during the one-line printing period, the printing based on the same one-line transfer data is effected by driving each heating element the same consecutive number of times in a plurality of different positions within the width of one-line pitch.

1 Claim, 6 Drawing Sheets

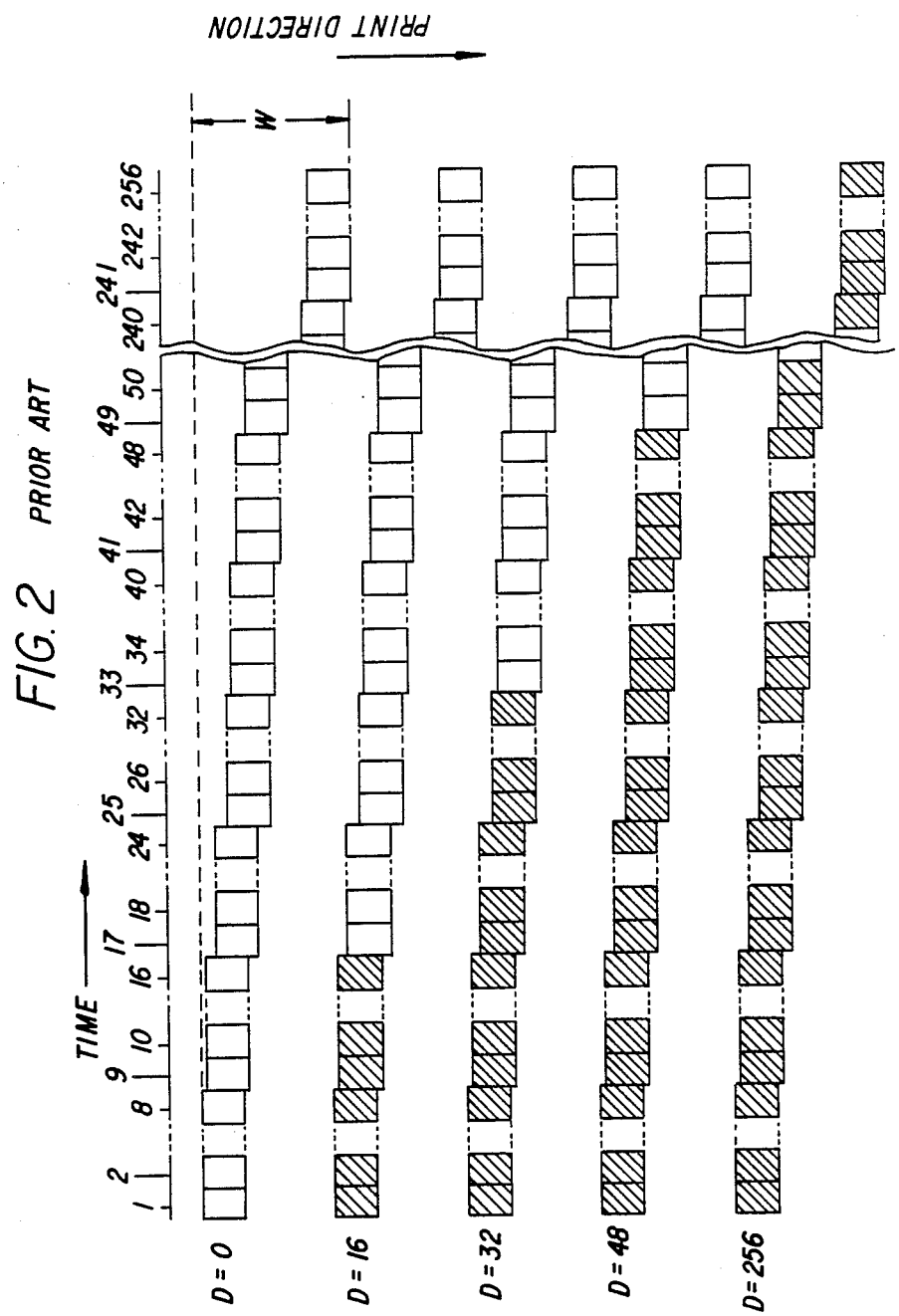

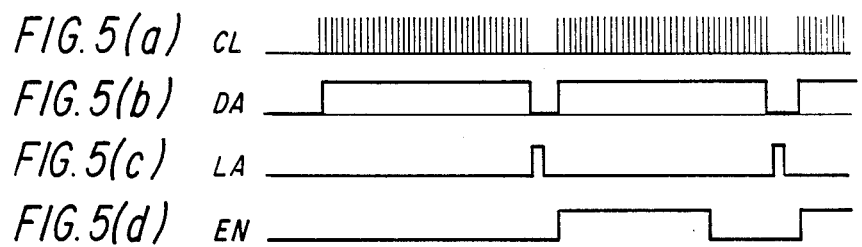
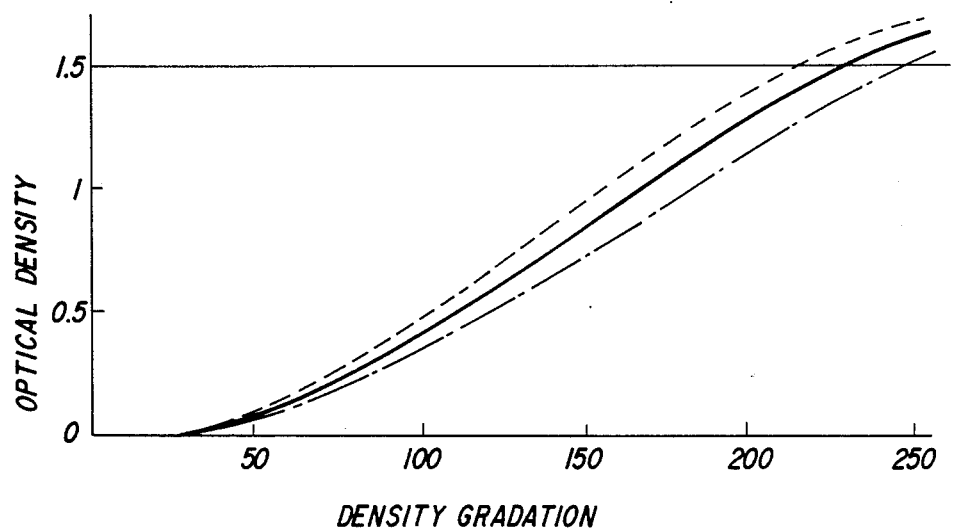
FIG. 7

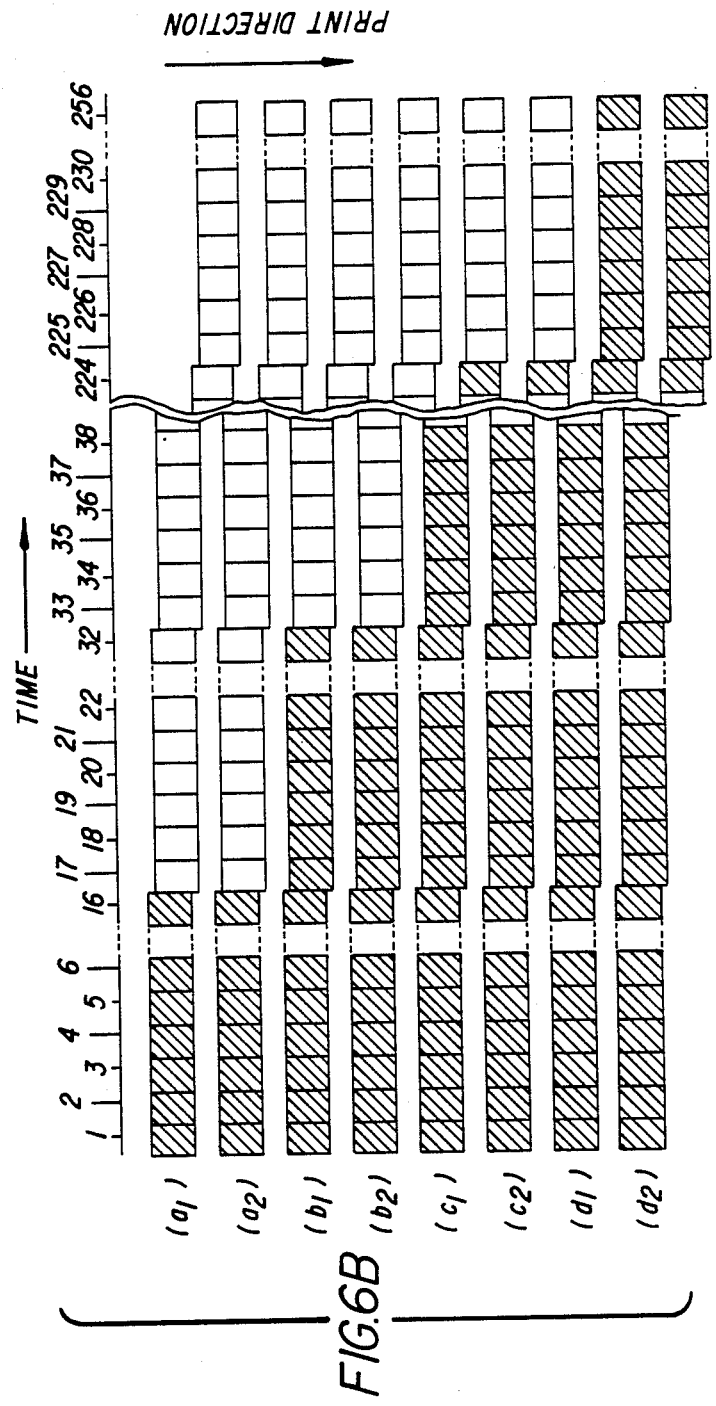

METHOD OF AND APPARATUS FOR TRANSFERRING AN IMAGE IN A THERMAL TRANSFER PRINTER

CROSS-REFERENCE TO RELATED APPLICATION

Reference is made to commonly assigned U.S. patent application Ser. No. 288,316 filed Dec. 22, 1988 entitled "Selective Energization of Thermal Printers" to Masaki Izumi, now Patent No. 4899170.

BACKGROUND OF THE INVENTION

1. Field of the Invention

The present invention generally relates to transferring an image to a receiver in thermal transfer printers.

2. Description of the Prior Art

A wide variety of proposals associated with a head driving unit for use with a thermal transfer printer have heretofore been offered. One typical arrangement of a line-by-line type transfer head of a thermal transfer printer for performing two-dimensional printing, which is disclosed, e.g., U.S. Pat. No. 4,621,271 patented on Nov. 4, 1986, is provided with a shift register and a latch circuit, and the printing is effected by an enable pulse after latching transfer data for each line in the latch circuit. For the purpose of printing with gradation, for instance, the time-width of the enable pulse for driving heating resistance elements is changed according to density gradation data; or alternatively the number of pulses driving the heating element is varied.

Dye on an ink film is fused or sublimated by the heat emitted from the heating elements, thereby effecting the transfer of the dye to a receiver. In this case, however, when saturated transfer is performed in the same position for a long period of time, re-transfer phenomenon causes color dye to revert from the receiver to the ink film. Normally each line transfer is carried out while moving the receiver and the ink film.

To describe the one-line transfer in greater detail, a receiver 1 is, as depicted in FIG. 1, wound on a cylindrical roller 2 generally referred to as a drum. Roller 2 is rotated by means of a stepping motor 3, and the printing position on receiver 1 is shifted. An ink film 4 is interposed between receiver 1 and a printing head H.

During one-line printing, roller 2 shifts receiver 1 by the width W corresponding to the one-line pitch. As discussed above, receiver 1 is moved not in a continuous manner but in an intermittent manner by roller 2 moved by stepping motor 3 every time a certain number of enable pulses are generated. The number of steps with which roller 2 is moved during the one-line printing period can be varied if a pulse generator is programmed by software.

Turning next to FIG. 2, there is schematically shown the situation of how a single heating element is driven in accordance with the density gradation data on the assumption that 256 enable pulses (accordingly, the maximum density gradation is 256) are supplied during the one-line printing period, roller 2 being moved 32 steps in this period. The reference numerals ranging from 1 to 256 arranged in the uppermost part of FIG. 2 respectively indicate the timings at each of which one enable pulse is generated during the one-line printing period. Rectangular shapes laterally arranged corresponding to these generation timings indicate the intervals at which the heating elements are driven on or are not driven when the density gradations are 0, 16, 32, 48 and 256 respectively shown as D=0, D=16, D=32, D=48 and D=256. The rectangular shapes marked with oblique lines imply that the heating elements are driven, whereas the blank rectangular shapes imply that the heating elements are not driven.

In this example, 256 enable pulses are generated, and roller 2 is moved 32 steps. Therefore, it follows that the roller is shifted one step for every 8 enable pulses. For example, when the density gradation is 16, heating element 11 is driven on during the period in which the 1st to 16th enable pulses are generated. Thereafter, heating element 11 is not driven until after the 256th enable pulse is generated. Meanwhile, roller 2 moves step by step at the time when the 8th, 16th, . . . , 256th enable pulses are generated.

After roller 2 has shifted 32 steps, the heating element is located on the next printing line. If a transfer image extends over two lines or more, the operations discussed above are repeated.

FIG. 3 shows a relation of a transfer print between the density gradation and the optical density according to a conventional thermal printer. It can be observed from FIG. 3 that if the density gradation increases to some extent, the saturation takes place when the optical density comes to around 1.4. Consequently, the maximum density of the image is low and the resulting image exhibits poor contrast. It can also be considered that the voltage impressed on the head can be increased to raise the upper limit of the optical density. If the voltage is augmented, the re-transfer phenomenon appears, and it would be impossible to raise the upper limit of the optical density further.

In the conventional image transfer apparatus, as can be understood from the description given above in conjunction with FIG. 2, the driving of the heating elements begins with the first enable pulse. The period in which each heating element is driven is defined by:

$$T \times (d/D)$$

where T is the printing period for one line, d is a desired density gradation and D is the maximum density gradation. If the desired density gradation d is, for example, substantially one-half of the maximum density gradation D, the printing is effected only on the first half of the printing space for one line. The second half of the printing space is not printed. Hence, dye is not uniformly transferred across the entire line width W.

SUMMARY OF THE INVENTION

It is a primary object of the present invention is to obviate the foregoing defects inherent in transferring an image.

It is another object of the invention is to provide an image transfer method and apparatus which are capable of raising the upper limit of the optical density of transfer prints and of obtaining transfer prints which exhibit both well-conditioned continuity between adjacent printed lines and good gradation.

To be specific, in a thermal transfer printer comprising a printing head having a plurality of heating elements for printing, a recording medium being moved with respect to the plurality of heating elements, the individual heating elements being selectively driven a number of times corresponding to transfer data indicative of gradation or dye density of a transfer print formed on the recording medium by driving the respective heating elements to transfer dye from an ink film to the recording medium, an image transfer method according to the present invention is characterized by the steps of: storing transfer data for one-line in a memory; reading the one-line transfer data a plurality of times from the memory during the one-line printing period while the recording medium is moved one-line pitch with respect to the heating elements; and causing each heating element to effect printing the same number of times in different positions within the width of one-line pitch in accordance with the same transfer data.

An image transfer apparatus for embodying the above-said transferring method comprises a printing head having a plurality of heating elements; a memory capable of storing and reading transfer data for printing one-line; control means for reading the same one-line transfer data n-times (n being an integer of 2 or more) from the memory during the one-line printing period; heating element driving means for selectively driving each heating elements on the basis of the transfer data read from the memory; and shifting means for moving a recording medium a plurality of times during the one-line pitch with respect to the heating elements during the one-line printing period, whereby the printing of each heating is effected on the bases of one-line transfer data in different positions within the one-line pitch during the one-line printing period.

In one preferred embodiment of the present invention an image transfer apparatus comprises a printing head having a plurality of heating element; a line memory for storing and reading transfer data for printing one-line; control unit for reading the same transfer data n-times (n being an integer of 2 or more) as large as the number corresponding to the maximum gradation (dye density) of a transfer print to be formed on a recording medium during the one-line printing period; a data processing unit for deciding whether the respective heating elements should be driven or not on the basis of the transfer data every time the transfer data is read from the line memory; register means for storing a result of the decision made in the data processing unit; a control circuit for outputting enable pulses n-times; gate means for selectively actuating the heating elements in accordance with the content stored in the register means every time the enable pulse is received; and shifting means for moving the recording medium with respect to the heating elements by a factor of n of one-line pitch during the period in which the enable pulse is outputted a number of times corresponding to the maximum gradation, whereby one-line printing is effected said number of times in different positions within the one-line pitch during the one-line printing period.

The shifting means in the foregoing image transfer apparatus includes a roller and a stepping motor of rotating the roller.

A feature of the present invention, is that printing is carried out the same consecutive of times in different positions on the basis of the same one-line transfer data during the one-line printing period, thereby increasing the upper limit of optical density of transfer print. Moreover, the print continuity between adjacent printing lines is enhanced, and smooth, clear and fine prints are obtained.

The foregoing and other objects and novel features of the invention will become more apparent in reference to the following description in conjunction with the accompanying drawings.

BRIEF DESCRIPTION OF THE DRAWINGS

FIG. 2 is used for explaining a method of driving the conventional image transfer apparatus;

FIG. 5 is a diagram depicting a variety of pulses supplied to a printing head of the image transfer apparatus illustrated in FIG. 4;

FIGS. 6A and 6B are used for explaining a method of driving the image transfer apparatus depicted in FIG. 4; and FIG. 7 is a diagram showing a relation between density gradation and optical density of a transfer print produced by the image transfer apparatus of FIG. 4.

DETAILED DESCRIPTION OF THE PREFERRED EMBODIMENTS

Figure 1:
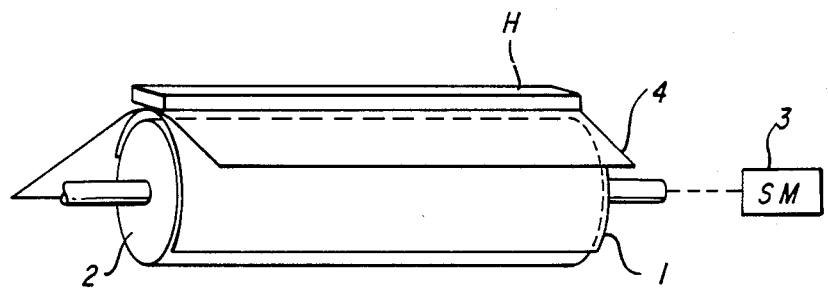
FIG. 1 schematically illustrates a printing unit of a conventional image transfer apparatus.
Figure 3:
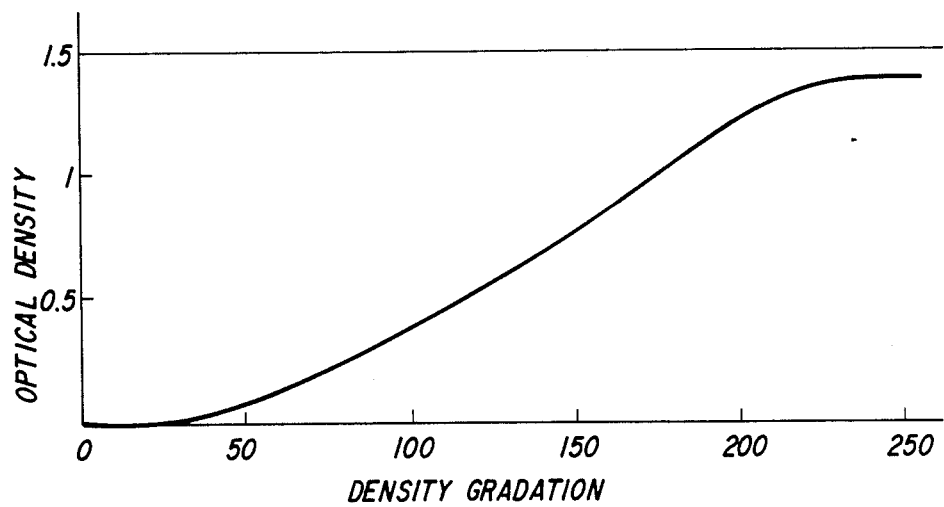
FIG. 3 is a diagram showing a relation between density gradation and optical density of a thermal transfer print based on the prior art.
Figure 4:
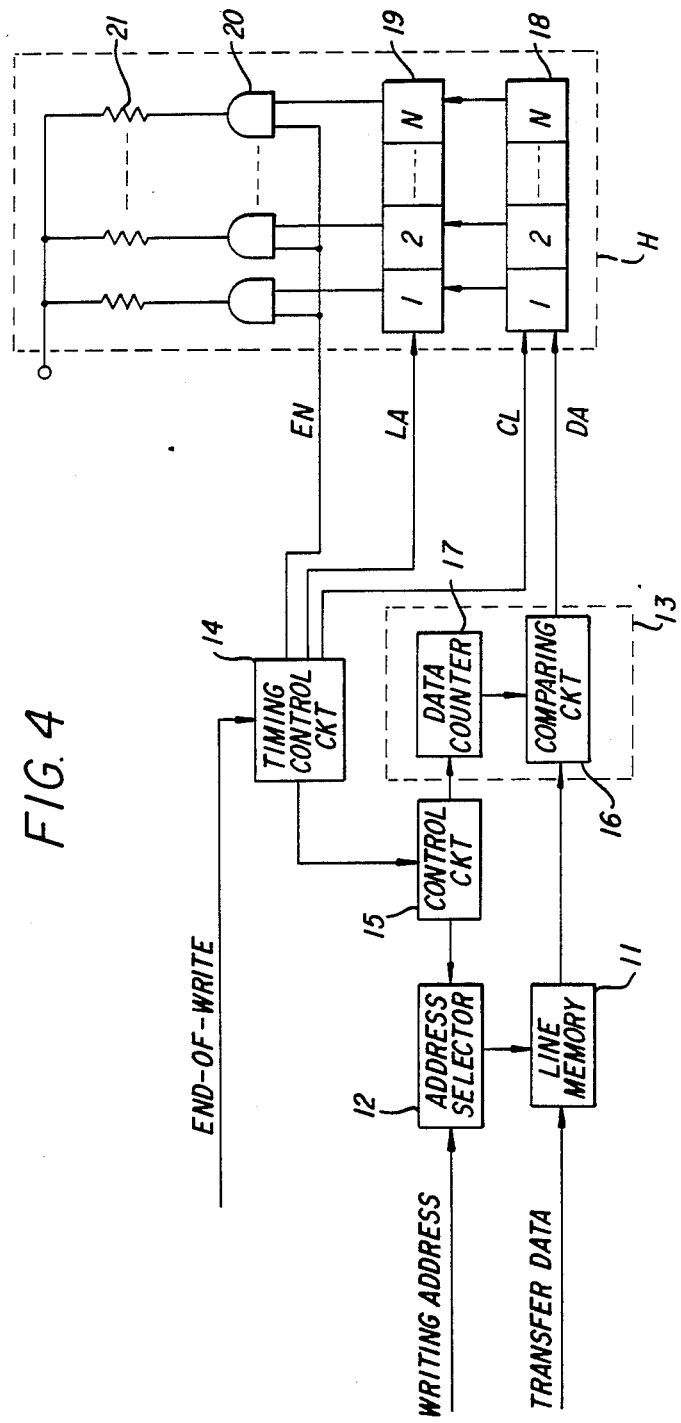
FIG. 4 is a block diagram depicting a construction of one embodiment of an image transfer apparatus according to the present invention.

FIG. 4 is a block diagram illustrating a construction of one embodiment of an image transfer apparatus according to the present invention. This type of image transfer apparatus transfers dye from an ink film to a record medium on the basis of transfer data (multivalued data) obtained by sequentially scanning, line by line, on an original such as a photo, a manuscript or the like. A line memory 11 serves to store under control of an address selector 12 the multivalued transfer data for printing one-line which is obtained through the line scanning.

The data read from line memory 11 is supplied to a data processing unit 13. The data is read from line memory 11 under the control of a control circuit 15 which receives a timing signal from a timing control circuit 14. Data processing unit 13 includes a data comparing circuit 16 and a data counter 17. The transfer data is supplied from line memory 11 to data comparing circuit 16 in data processing unit 13. Data comparing circuit 16 is also supplied with an output of data counter 17 controlled by control circuit 12.

An output of data comparing circuit 16 is given to a printing head H for a thermal transfer printer. Printing head H comprises: an N-bit shift register 18 for receiving the data from data comparing circuit 16; a latch circuit 19 for latching the data read from shift register 18; N gate circuits 20 for gating an output of latch circuit 19; and N heating elements 21 connected respectively to the corresponding outputs of gate circuits 20. Timing control circuit 14 supplies shift register 18, latch circuit 19 and gate circuits 20 with pulses for controlling the operations of these components.

The image transfer apparatus according to the present invention is characterized in that one-line printing for each heating element is effected a plurality of times M in different positions within one-line pitch in accordance with the same transfer data.

The description will next deal with the function of the image transfer apparatus of FIG. 4. The transfer data (multivalued data) are obtained by scanning line, by line, an original. The obtained transfer data for printing one-line is stored in line memory 11. At this time, a writing address is supplied via address selector 12 to line memory 11. When an end-of-writing signal indicating the completion of data storage into line memory 11 is sent from an image signal take-in control unit (not illustrated), timing control circuit 14 issues a start-of-transfer command to control circuit 15. Upon receipt of this command, control circuit 15 sends a reading address via address selector 12 to line memory 11 from which the one-line transfer data is then read. The one-line transfer data is supplied to data comparing circuit 16. Simultaneously, control circuit 15 transmits a clock pulse to data counter 17 which then outputs "1". The output "1" is then input to data comparing circuit 16.

Data comparing circuit 16 compares "1", the output from data counter 17, bit by bit with density gradation data in the one-line transfer data as supplied to each of heating elements 21. If the density gradation data is equal to or greater than "1", data comparing circuit 16 outputs "1". If the density gradation is smaller than "1", data comparing circuit 16 outputs "0". Thus, data comparing circuit 16 outputs a pulse train in which "0" is disposed in the positions corresponding to those of the density gradation data smaller than "1" in the transfer data.

A pulse train DA (FIG. 5(b)) output from data comparing circuit 16 is timing-controlled by a clock pulse CL (FIG. 5(a)) transmitted from timing control circuit 14, and is then set in shift register 18 in printing head H. Timing control circuit 14 transmits a latch signal LA (FIG. 5(c)) to latch circuit 19 which in turn latches the data stored in shift register 18. By this moment, timing control circuit 14 has already applied an enable pulse EN (FIG. 5(d)) to gate circuits 20. Hence, only the heating elements corresponding to the bits in which "1" is latched in latch circuit 19 are selectively driven, thereby emitting heat. Dye on a ink film is diffused or sublimated to the record medium by the heat emitted from the driven heating elements 21.

Next, control circuit 15 causes the same transfer data to be read again from line memory 11 and data counter 17 to output "2". Then, data comparing circuit 16 compares "2" with the density gradation data of the transfer data read from memory 11. If the density gradation data are equal to or greater than "2", data comparing circuit 16 outputs "1", and if smaller than "2", data comparing circuit 16 outputs "0". Thus, a pulse train made in the same way as described above is output from data comparing circuit 16 and set in shift register 18 under control of clock pulses CL transmitted from timing control circuit 14. As in the case discussed above, heating elements 21 corresponding to the bits in which "1" is set with the latch circuit 19 are driven, thereby performing the transfer of the dye to the record medium. The same operations as those described above are hereinafter repeated until the output from data counter 17 reaches the maximum density gradation data. In this manner, the first line transfer is completed.

After the one-line transfer, the record medium and the ink film are shifted W/M with respect to printing head H. Control circuit 15 then actuates address selector 12 to transmit to line memory 11 the same reading address as that transmitted to the first line transfer. Thus, the operations identical with those in the first line transfer are repeatedly performed. The second line transfer is effected in the position which is W/M far from the position in which the first line transfer was carried out. Hereafter, the line transfer is likewise executed M-times in different positions within the width W of one-line pitch using the same transfer data, thus completing the transfer within the width W of one-line pitch.

With this arrangement, the upper limit of optical density of a transfer print is raised, and it is possible to obtain prints exhibiting good gradation and well-conditioned continuity or uniformity between adjacent printing lines.

Figure 6A:
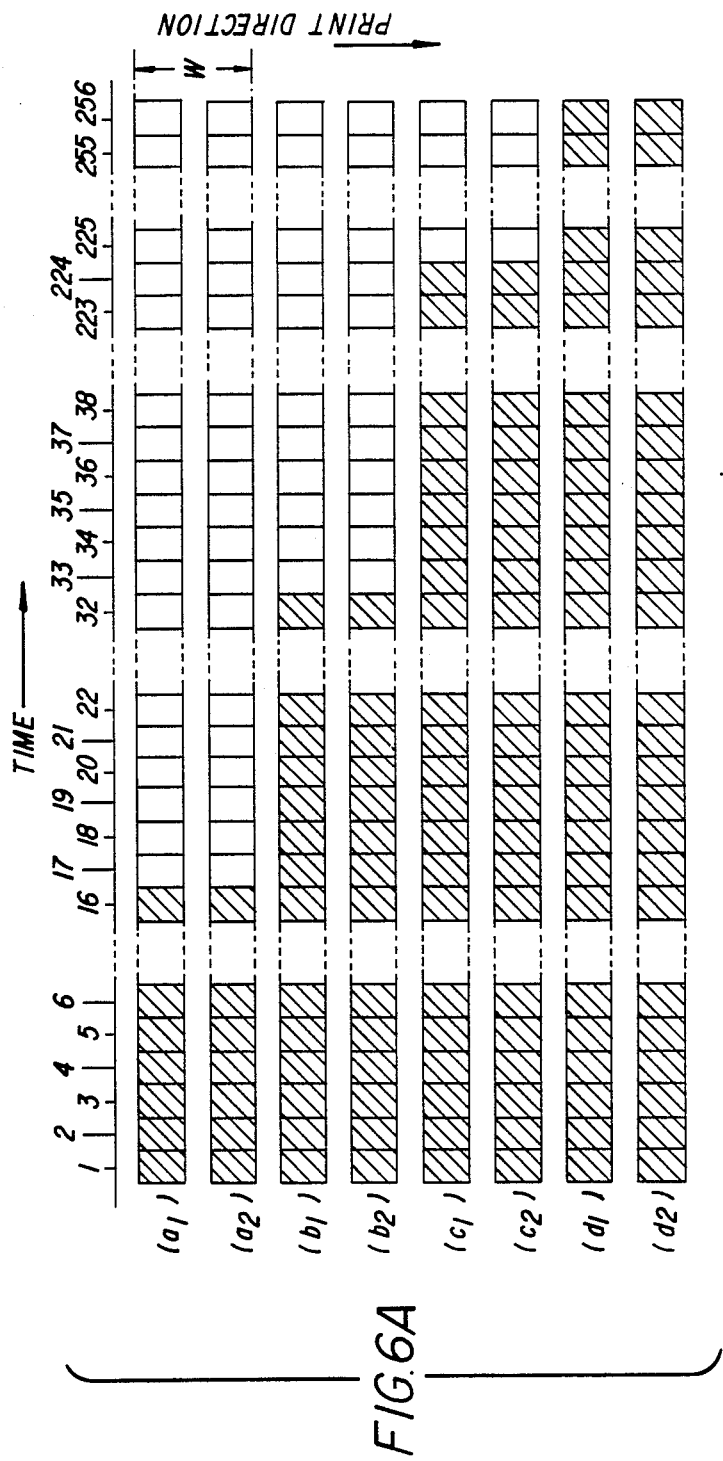

Turning to FIG. 6A, a schematic diagram for explaining the concept of one embodiment of an image transfer method according to the present invention is illustrated. The maximum density gradation for printing is assumed to be 256. The process to produce density gradation of 16, 32, 224 and 256 is exemplified to schematically show how a single heating element is driven for effecting the printing in different two positions within the width W of one-line pitch using the same one-line transfer data.

In FIG. 6A, since the maximum density gradation is 256, the enable pulses are, as in the previous case, sequentially generated 256 times in order to effect the printing on the basis of the one-line transfer data. 256 enable pulses are generated in the second line transfer as well as in the first line transfer. The numerals shown in the uppermost part of the figure indicate each of the timings at which each enable pulse is generated in the first and second line transfer. The fact that the heating elements are driven when the respective enable pulses are generated is shown by marking with oblique lines the rectangular shapes arranged sideways corresponding to each timing when the enable pulses are supplied. Hence, rows ($a_1$) through ($d_2$) of these rectangular shapes respectively indicate both the period in which the single heating element is driven when the enable pulses are supplied in the first or second line transfer and the period in which the heating element is not driven.

How the heating element is driven in each timing when the enable pulses are supplied will now fully be explained with reference to FIG. 6A. In case the density gradation is 0, the heating element is not driven on during the period in which the record medium moves along the width W of one-line pitch with respect to the heating element. Accordingly, no dye transfer is effected, and hence no illustration is given herein.

The first printing operation when the density gradation is 16 is effected during the period in which the first to 16th enable pulses are generated. Thereafter, the heating element is not driven on until after the 256th enable pulse is generated. In the meantime the record medium moves W/2 with respect to the heating element. The first printing based on the one-line transfer data is thus finished. The operations associated with the first printing are illustrated in row ($a_1$). During the period in which the enable pulse is subsequently generated 16 times, the heating element is driven. Thereafter, the heating element is not driven till the 256th enable pulse is generated. Meanwhile the record medium moves W/2. The second half of operations are depicted in the form of the row ($a_2$). Thus the dye transfer operations based on the same one-line transfer data are performed in the upper and lower halves of the width W while the record medium moves W of one-line pitch.

The case where the density gradation is 32 and 224 is similar to the case where the density gradation is 16. In the first half of the period in which the record medium moves W/2 and the first through 256th enable pulses are generated, the heating element is driven on during the period in which the first through 32nd or first through 224th enable pulses are generated. Subsequent to this step, the same transfer operations are performed in the second half of period during which the record medium moves W/2. The rows ($b_1$), ($b_2$), ($c_1$) and ($c_2$) represent the dye transfer operations in the first and second halves of the period for the one-line transfer.

On the other hand, where the density gradation is 256, the printing is effected at all the timings of the enable pulses throughout the first and second line transfer during which the record medium moves W/2 with respect to the heating element.

Referring to FIG. 6A, the rectangular shapes are aligned in the lateral direction for easy understanding. As a matter of fact, however, each printing is carried out, as in the previous case, while moving the record medium little by little. The movement of the record medium comes to an end just when 256 enable pulses have been generated. FIG. 6B concretely illustrates an actual dye transfer process. In FIG. 6B, the record medium makes a small movement of 16 steps during the generation of 256 enable pulses (viz., the record medium moves one step every time 16 enable pulses are generated), causing the record medium to move W/2 with respect to the heating element.

In this manner, it is possible to increase the upper limit of the optical density of the transfer print by effecting the printing in different positions within the width of one-line pitch on the basis of the same transfer data. FIG. 7 shows a relation between the density gradation and the optical density in a case where the heating element is, as shown in FIG. 6B, driven. The dotted, solid and one-dotted chain lines respectively indicate the cases where the voltages 14.75 V, 14.5 V and 14.25 V are impressed on the printing head. It is observed from FIG. 7 that the upper limit of the optical density is raised up to 1.5–1.6. Judging from the experimental results, it also proves that the upper limit of the optical density can, as shown in FIG. 6B, be raised by driving the heating elements for transferring dyes magenta, yellow and cyan indispensable for color printing.

In accordance with the foregoing embodiment, as discussed above, the width W of the one-line pitch is split into halves, and the dye is transferred to the portion having the width of W/2 on the basis of the one-line transfer data. The number of divisions of the one-line pitch is not limited to 2, but the width W of the one-line pitch may be divided to any one of the integers greater than 2. In other words, the width of the one-line pitch is split into M-pieces of sections (M being an integer larger than 2), and the dye is transferred to each sections in accordance with the same one-line transfer data. In this case, if the time the printing head requires to scan one-line is the same as in the prior art image transfer apparatus, the time needed for one-line printing of the present invention is M times as large as that in the prior art apparatus.

The embodiment of the present invention has been described in great detail with reference to the accompanying drawings. It is to be understood that the invention is not limited to this embodiment. Various changes or modifications may be effected by those skilled in the art without departing from the scope and spirit of the invention.

What is claimed is:

1. A method of transferring an image to a recording medium by a thermal transfer printer including a print head having a plurality of heating elements for effecting the transfer of dye to the recording medium to print pixels of an image, a line at a time, with each line having a predetermined pitch width, comprising the steps of:

storing transfer data representing the dye density of each pixel in a line of an image;

moving the recording medium with respect to the heating elements to n separate positions to provide the line pitch width, where n is an integer of 2 or more; and driving any given heating element an equal number of times in each of the n different positions in accordance with the transferred data, whereby dye is uniformly transferred to the recording medium across the entire line pitch width.

* * * * *